United States Patent [19]

Matsumoto et al.

[11] Patent Number: 4,825,229

[45] Date of Patent: Apr. 25, 1989

[54] METHOD AND APPARATUS FOR INK JET PRINTING

[75] Inventors: Yasuo Matsumoto, Shizuoka, Japan; Eric J. Shrader, Palo Alto; Patricia O. Cohn, Redwood City, both of Calif.

[73] Assignee: Tokyo Electric Company, Ltd., Tokyo, Japan

[21] Appl. No.: 96,236

[22] Filed: Sep. 8, 1987

Related U.S. Application Data

[63] Continuation of Ser. No. 841,856, Mar. 20, 1986, abandoned.

[51] Int. Cl.[4] .............................................. G01D 15/16

[52] U.S. Cl. ........................................ 346/1.1; 346/75; 346/140 R

[58] Field of Search .......................... 346/140, 75, 1.1; 68/5 D

[56] References Cited

U.S. PATENT DOCUMENTS

| | | | |
|---|---|---|---|
| 1,841,452 | 1/1932 | Ranger | 346/75 |
| 3,709,432 | 1/1973 | Robertson | 346/75 X |
| 3,854,399 | 12/1974 | Keur | 346/75 X |
| 3,950,967 | 4/1976 | Davies | 68/5 D |
| 4,019,188 | 4/1977 | Hochberg et al. | 346/75 |
| 4,369,450 | 1/1983 | Iwagami | 346/75 |
| 4,411,706 | 10/1983 | Wallace | 346/25 X |
| 4,628,331 | 12/1986 | Ishikawa | 346/75 |
| 4,647,945 | 3/1987 | Andeen | 346/75 X |

FOREIGN PATENT DOCUMENTS

| | | |
|---|---|---|
| 52-36033 | 3/1977 | Japan . |
| 1482596 | 8/1977 | United Kingdom . |

OTHER PUBLICATIONS

Pelkie et al; Satellite Drop Remover, IBM TDB, vol. 18, No. 12, May 1976, p. 4000.

*Primary Examiner*—Joseph W. Hartary
*Attorney, Agent, or Firm*—Cushman, Darby & Cushman

[57] ABSTRACT

In an image recording method comprising the steps of heating a sublimable dye to produce dye vapor, jetting the dye vapor from a nozzle toward a recording member, and attaching the dye vapor to the recording member to form a picture image thereon, the method of the present invention is adapted such that a gas stream is provided to pass across the stream of the dye vapor jetted from the nozzle and the dye vapor or fine particles of the sublimable dye formed by being cooled are taken away from the vicinity of the recording member by means of the gas stream.

6 Claims, 3 Drawing Sheets

METHOD AND APPARATUS FOR INK JET PRINTING

This is a continuation of application Ser. No. 841,856, filed Mar. 20, 1986, now abandoned.

FIELD OF THE INVENTION AND RELATED ART STATEMENT

The present invention relates to an image recording method and its apparatus which jets dye vapor produced by vaporization of sublimable dye to a surface of a recording medium for forming thereon characters and patterns.

There have so far been proposed various methods which use sublimable dyes for picture image recording, a few of which will be exemplified below.

First, there is a method disclosed in Japanese Patent Publication No. 56-2020, which is as shown in FIGS. 5 and 6. Referring to one example as shown in FIG. 5, there are provided a nozzle 2 including therein sublimable dye 1, a recording member 3, a charging electrode 4 disposed therebetween, an electrostatic lens system 5, and electrostatic deflecting electrodes 6, wherein dye vapor 8 is generated by heating the dye by a heater 7 provided within the nozzle 2 and the dye vapor 8 is charged with electricity by the charging electrode 4. While the charged dye vapor 8 flies toward a back plate 9 disposed in the back of the recording member 3, the flying dye vapor 8 is converged by the electrostatic lens system 5 and deflected by the electrostatic deflecting electrodes 6 and attached to the surfaces of the recording member 3.

And, the other example as shown in FIG. 6 is provided with an electrostatic shutter 10 instead of the electrostatic deflecting electrodes 6 in the structure of FIG. 5, and the jet amount of the dye vapor 8 to the recording member 3 is controlled by the electrostatic shutter 10.

As systems using a plurality of such fundamental arrangements of recording method as described above to achieve color recording, there are such as disclosed in Japanese Patent Laid-open Nos. 54-71636 and 54-71637.

According to these systems, the dye vapor 8 is continuously jetted from the nozzle 2. And therefore, there has been such a problem that the recording member 3 is stained by the dye vapor 8 jetted during a nonprinting period whereby the picture image is degraded.

A second method in the prior art is that which is described in Japanese Patent Laid-open No. 59-22759 as shown in FIG. 7. According to this method, in front of a nozzle 11 are radially arranged three-color sublimable-dye sticks 12 on a plane perpendicular to the axis of the nozzle, and there are also provided a laser beam source 13 and an air system 14. A lens system 15 is driven such that the laser beam from the laser beam source 13 is condensed and irradiated on a desired sublimable dye stick 12 out of the three colors of the sublimable dye sticks 12 to produce vapor of that dye. The dye vapor is jetted from the tip of the nozzle 11 by action of compressed air sent from the air system 14 and attached to the surface of a recording member 16.

In the case of the present method, the flow of the compressed air blown out from the nozzle 11 impinges on the recording member 16 and diverted thereby from its course and spread around the nozzle 11 along the recording member 16. Since the dye vapor transported by the compressed air is thus spread to a rather wide range compared with the diameter of the nozzle 11, it has been a difficulty of this method that the recording member 16 is thereby stained and quality of the picture image deteriorated.

OBJECT AND SUMMARY OF THE INVENTION

A first object of the invention is to provide image record of good quality.

A second object of the invention is to provide an apparatus which will achieve the above mentioned object in a simple structure.

Other objects of the invention will become apparent from the following description.

In an image recording method comprising the steps of heating a sublimable dye to produce dye vapor, jetting the dye vapor from a nozzle toward a recording member, and attaching the dye vapor to the recording member to form a picture image thereon, the present invention generates a gas stream passing across the dye vapor stream jetted from the nozzle, whereby the surface of the recording member is prevented from being stained and image recording of good printing quality is attained.

DETAILED DESCRIPTION OF THE PREFERRED EMBODIMENTS

Figure 1:
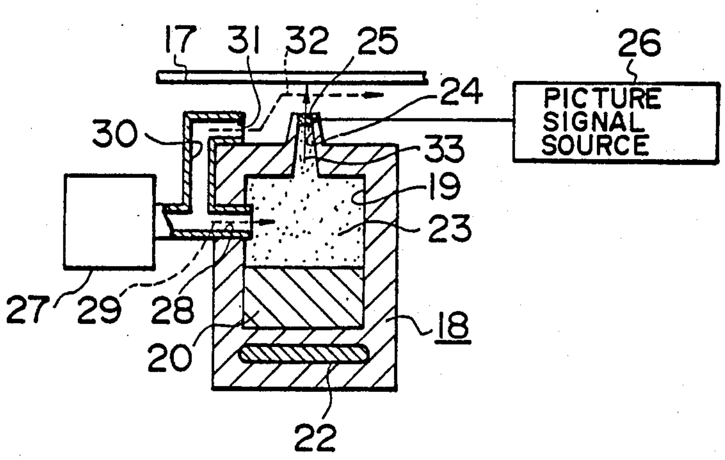
FIG. 1 is a side view in vertical cross-section showing a first embodiment of the invention.
Figure 2:
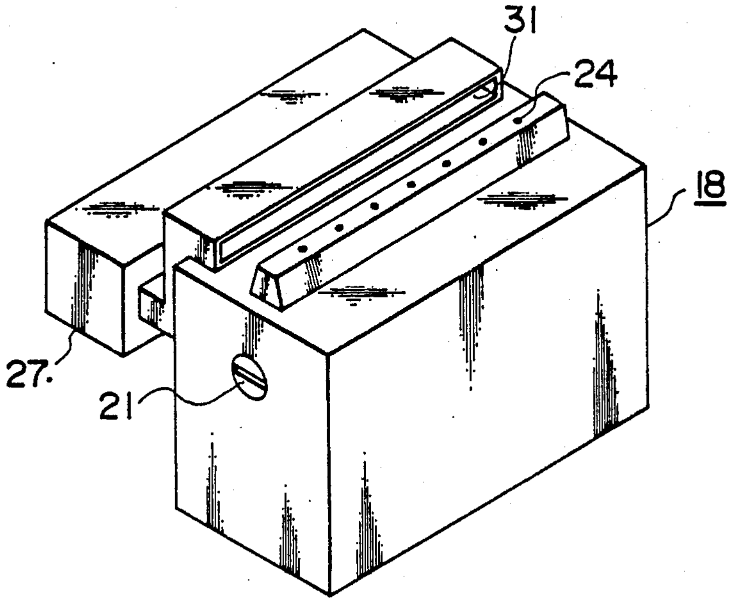
FIG. 2 is a perspective view of the same.

A first preferred embodiment of the invention will be described below with reference to FIGS. 1 and 2. To begin with, a recording head 18 is provided opposite to a recording member 17. Within the recording head 18 is formed a dye chamber 19, and there is contained a sublimable dye 20 inside the dye chamber 19. On the side face of the recording head 18, there is provided a dye supply portion 21 wherefrom the sublimable dye 20 is adapted to be supplied to the dye chamber 19. Under the dye chamber 19 is provided a heater 22 serving as a heating device and the sublimable dye 20 heated by the heater 22 is formed into dye vapor 23 to fill up the dye chamber 19.

On one side of the dye chamber 19, there are provided a plurality of nozzles 24 opening toward the recording member 17 and arranged at predetermined spacings in a straight line. Each nozzle 24 is provided at the tip thereof with a spray amount control device 25. A shutter by means of electrostriction resonator, magnetostriction resonator, or the like is employed as the spray amount control device 25. These spray amount control devices 25 are connected with a picture signal source 26, and the amounts of the dye vapor 23 jetted from the nozzle 24 are adapted to be controlled by a picture signal from the picture signal source 26.

Further, an air pump 27 as a gas stream generating device is provided. This air pump 27 is connected with the dye chamber 19 by an air passage 28 and produces an air stream 29 to build up the internal pressure within the dye chamber 19. An air passage 30 is also drawn from the air pump 27 and the end of the air passage 30, formed into an air outlet 31, is opened close to the nozzle 24. The air stream blown out from the air outlet 31 forms an air stream 32 passing across the space between the nozzle 24 and the recording member 17. The velocity of the air stream 32 is to be regulated so as not to disturb the dye vapor stream 33 jetted from the nozzle 24 and therefore set to one fifth the velocity of the dye vapor stream 33.

In the described structure, the air whose pressure is boosted by the air pump 27 builds up the internal pressure within the dye chamber 19 and, on the other hand, passes through the air passage 30 and is blown out from the air outlet 31 to be formed into the air stream 32. Under these conditions, the spray amount control device 25 is actuated by a signal from the picture signal source 26 and a specific nozzle 24 is thereby opened to produce the dye vapor stream 33. The dye vapor stream 33, without being disturbed by the air stream from the air outlet 31, allows the dye vapor 23 to get in contact with and attached to the surface of the recording member 17, whereby a dot as a picture element is formed thereon. At this time, however, not all portion of the dye vapor 23 jetted from the nozzle 24 is attached to the recording member 17, but some portion thereof remains floating, or suspended, close to the surface of the recording member 17. The floating dye vapor 23, or fine particles formed from the sublimable dye which has already cooled down are took away from the surface of the recording member 17 by the air stream 32 coming from the air outlet 31. Thus, the recording member 17 is prevented from being stained by the surplus dye vapor 23 in picture image forming and fine particles formed from the cooled sublimable dye, and therefore the quality of the picture image is maintained in good condition.

By the way, in the above described embodiment, the surplus dye vapor 23 in picture image forming or the fine particles formed from the cooled sublimable dye have been taken away by means of an air stream, but in implementation a suitable gas may also be employed.

Figure 3:
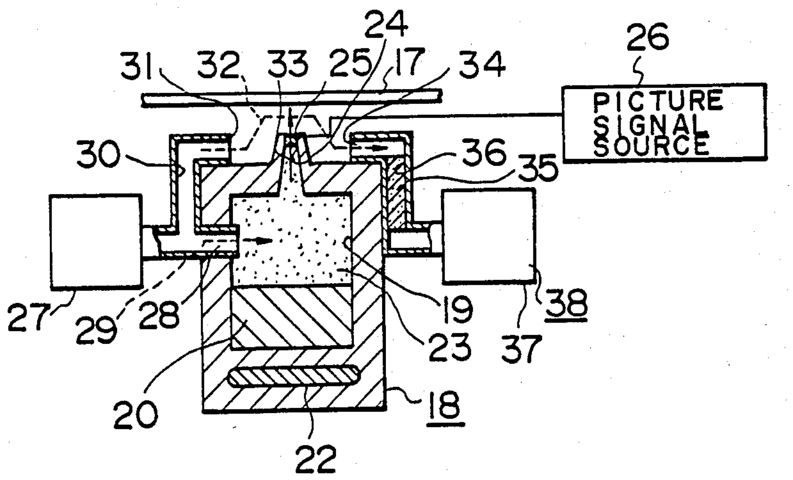
FIG. 3 is a side view in vertical cross-section showing a second embodiment of the invention.
Figure 4:
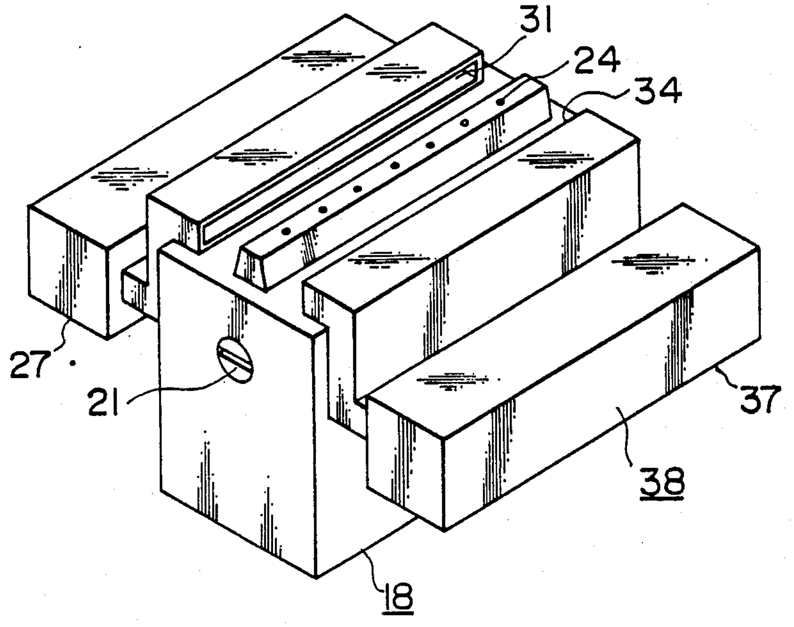
FIG. 4 is a perspective view of the same.
Figure 5:
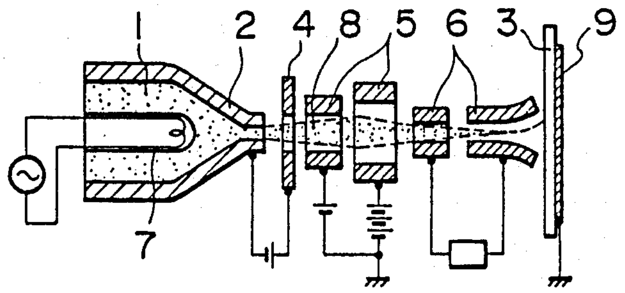
FIG. 5 (PRIOR ART)
FIGS. 5 to 7 are side views in vertical cross-section showing examples of the prior art.
Figure 6:
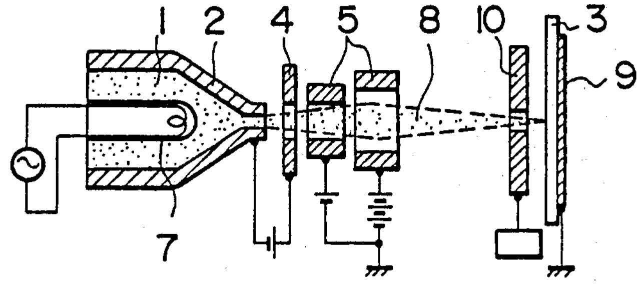
FIG. 6 (PRIOR ART)
Figure 7:
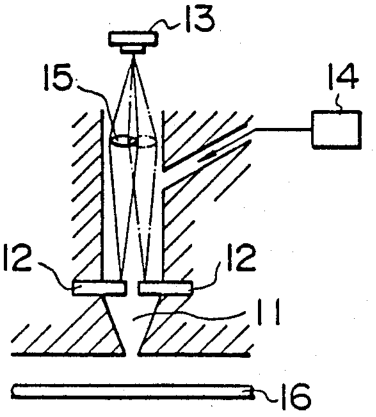
FIG. 7 (PRIOR ART)

Now, a second preferred embodiment of the invention will be described with reference to FIGS. 3 and 4, wherein like or corresponding parts to those in the above described first embodiment are denoted by like reference numerals and description thereof are omitted. The present embodiment is arranged such that an air suction opening 34 is disposed opposite to the air outlet 31 with the nozzle 24 located therebetween. The air suction opening 34 is connected to an air passage 36 with a filter 35 provided therein and further connected to a suction pump 37, whereby a gas suction device 38 is formed.

In the described structure, the air stream 32 passing across the dye vapor stream 33 jetted from the nozzle 24 is sucked in by the suction pump 37 through the air suction opening 34. And the dye vapor which has not attached to the recording member 17 or the fine particles of the sublimable dye formed by being cooled are recovered by the filter 35. Therefore, the apparatus is prevented from being contaminated by the dye vapor or the fine particles of the sublimable dye formed by being cooled.

What is claimed is:

1. In an image recording method comprising the steps of producing a first gas stream and a second gas stream, heating sublimable dye in a positively pressurized dye chamber to produce dye vapor, jetting the dye vapor from a nozzle, utilizing a spray amount control device, toward a recording member, and attaching the dye vapor to the recording member to form an image thereon, the improvement comprising the steps of positively pressurizing said dye chamber utilizing the first gas stream thereby to jet said dye vapor from said dye chamber at a given vapor velocity, generating the second gas stream having certain air velocity relative to said vapor velocity, and passing said second gas stream along the surface of said recording member across the stream of said dye vapor at a velocity of flow such as not to disturb the dye vapor stream thereby to clean said recording member of unattached particles of dye vapor.

2. An image recording head for recording images on a recording member, said head comprising a dye chamber containing a sublimable dye and controllable jetting means for jetting dye vapor, a heating device for heating said sublimable dye, a source of positive pressure, a first air passage connected to the source of pressure to effect jetting of a first gas stream from said dye chamber, a second air passage connected to the source of pressure to effect jetting of a second gas stream along the surface of the recording member, said first air passage and said second air passage being disposed on said head and having communicating paths on said head which diverge from the source of pressure, said jetting means including nozzles for jetting therefrom dye vapor produced by the heating at a given vapor velocity in response to said heating at a given vapor velocity in response to said pressurizing, and spray amount control devices responsive to an image signal for controlling each of said nozzles, said second air passage having an outlet for the purpose of jetting the second gas stream, passing in close proximity to said recording member across the stream of the dye vapor jetted from said nozzle, wherein said first and second air passages including means defining a velocity relationship between said first and second gas streams during variations in pressure in said dye chamber resulting from control of said jetting means, thereby to clean said recording member of unattached particles of dye vapor without disturbing the trajectory path of said jetted dye vapor.

3. An image recording head according to claim 2, wherein said nozzles are disposed in alignment.

4. An image recording head according to claim 3, wherein an air outlet with a long and narrow opening is provided alongside the alignment of the nozzle.

5. An image recording head for recording images on a recording member, said head comprising a dye chamber containing a sublimable dye and controllable jetting means for jetting dye vapor, a heating device for heating said sublimable dye, a source of positive pressure, a first air passage connected to the source of pressure to effect jetting of a first gas stream from said gas chamber, a second air passage connected to the source of pressure to effect jetting of a second gas stream along the surface of the recording member, said first air passage and said second air passage being disposed on said head and having communicating paths on said head which diverge from the source of pressure, said jetting means including nozzles for jetting therefrom dye vapor produced by the heating at a given vapor velocity according to said pressurizing, and spray amount control devices responsive to an image signal for controlling each of said nozzles, said second air passage having an outlet for the purpose of jetting the second gas stream passing along the surface of said recording member across the stream of the dye vapor jetted from said nozzle for cleaning the recording member of unattached particles of dye vapor, said first and second passages including means defining a velocity relationship between said first and second gas streams during variation in pressure in said dye chamber, and a gas suction device for sucking in the gas in the vicinity of the nozzle thereby to collect said unattached particles.

6. An image recording head for recording images on a recording member, said head comprising a dye chamber containg a sublimable dye, a heating device for heating said sublimable dye, a source of positive pressure, a first air passage having an outlet connected to the source of pressure to effect jetting of a first gas stream from said gas chamber, a second air passage connected to the source of pressure to effect jetting of a second gas stream therefrom along the surface of the recording member, said first air passage and said second air passage being disposed on said head and having communicating paths diverging from the source of pressure, nozzles having outlets for jetting therefrom dye vapor produced by the heating at a given vapor velocity according to said pressurizing, and spray amount control devices responsive to an image signal for controlling each of said nozzles, said second air passage having an outlet to effect jetting the second gas stream passing along the surface of said recording member across the stream of the dye vapor jetted from said nozzle for cleaning the recording member of unattached particles of dye vapor, said first and second passages including means defining a velocity relationship between said first and second gas streams wherein the area of the outlet of the second air passage is greater than the area of the outlets of the nozzles.

* * * * *